United States Patent [19]

Stöver et al.

[11] Patent Number: 5,599,889
[45] Date of Patent: Feb. 4, 1997

[54] METHOD OF FORMING POLYMER MICROSPHERES

[76] Inventors: Harald D. H. Stöver, 50-405 Main Street, Dundas, Ont., Canada, L9H 6P8; Kai Li, 740 Proudfoot Lane, Unit 1116, London, Ont., Canada, N6H 5H2; Wen H. Li, 64 North Oval, Hamilton, Ont., Canada, L8S 3Y8

[21] Appl. No.: 291,163

[22] Filed: Aug. 16, 1994

[51] Int. Cl.$^6$ .................................................. C08F 2/06
[52] U.S. Cl. .................. 526/217; 526/218.1; 526/219.3; 526/293; 526/347.1
[58] Field of Search ................. 526/217, 218.1, 526/219.3

[56] References Cited

U.S. PATENT DOCUMENTS 5,281,631  1/1994  Horwitz ................................. 521/38

FOREIGN PATENT DOCUMENTS 0393510  10/1990  European Pat. Off. .
0398538  11/1990  European Pat. Off. .

OTHER PUBLICATIONS

'Polymer Morphology', Geil Et Al. J. Macromol. Sci.–Chem A11(7) pp. 1271–1280 (1977).
'Porosity Determination . . . Gels', Schmid Et Al. Makromol. Chem. 1991 7 pp.
"The Mechanism of Core Shell . . . ", Lee Et Al. J. Poly. Sci Part A vol. 30, 865–871 (1992).
"Preparation of Copolymer Microspheres . . . " Naka Et Al. J. Poly. Sci vol. 30 2149–2158 (1992).
"Monodisperse Porous Polymer Particles: . . . ", Cheng Et Al. J. Poly. Sci vol. 30, 245–256 (1992).
"Particle Size Control . . . " Lok Et Al. Can J. Chem. vol. 63, 1985.
"Studies on the Preparation: . . . ", Chung–Li Et Al Progr. Colloid, Poly. Sci. 60 163–175 (1976).
"Modelling The Kinetics . . . ", Avela Et Al. Makromol. Chem. 175 (1990) 107–116 (Nr 2931).
"Polymer Science", Okubo Et Ai. Colloid Polym. Sci. 268:791–796 (1990).
"Monodispersed . . . Polymerization"; Ober Et Al. Journal of Polymer Science vol. 23, 103–108 (1985).
"Polychlorometylstyrene . . . and Characterization", Margel Et Al. J. Poly. Sci vol. 29, 347–355 (1991).
"Preparation . . . Growth", Naka Et Al. J. Poly. Sci vol. 30 1287–1298 (1992).
"Preparation . . . Method", Okubo Et Al. Colloid Polym. Sci. 269:222–226 (1991).
"Synthesis and Properties . . . " Smigol Et Al J. Appl. Polym. Sci. vol. 46 1439–1448 (1992).
"Suspension . . . Survey", Arshady Colloid. Polym. Sci. 270:717–732 (1992).
"Synthesis . . . Beads" Okay Et Al. J. App. Polym. Sci. vol. 46, 401–410 (1992).
"Particle Precipitation . . . Supports", Ramford Et Al. J. Appl. Polym. Sci vol. 25 2559–2566 (1980).

(List continued on next page.)

*Primary Examiner*—Christopher Henderson
*Attorney, Agent, or Firm*—Thomas A. O'Rourke

[57] ABSTRACT

Disclosed herein is a method of forming cross-linked polymer microspheres, comprising the steps of:
forming a reaction mixture essentially free of stabilizer and comprising a polymerization medium, a di-vinyl cross-linking agent, a functional co-monomer which is copolymerizable with said cross-linking agent and a radical initiator, with said cross-linking agent, said functional co-monomer and said initiator being soluble in said polymerization medium;
subjecting said reaction mixture to conditions selected to form microspheres with two modes of stabilization, a first being provided by cross-linking, and a second being provided by short stabilizing chains extending outwardly from the microsphere and into said medium, said stabilizing chains having a sufficient concentration of said functional co-monomer to have steric stability in said medium.

6 Claims, 13 Drawing Sheets

OTHER PUBLICATIONS

"Swelling of Oligomer . . . Dispersions" Ugelstad Et Al Interface Science 13 (1980) 101–140.

"Novel Polystyryl Resins . . . ", Li Et Al. J. Polym. Sci. vol. 32 2029–2038 (1994).

"The Modification . . . Microgels" Ma Et Al. J. Appl. Polym. Sci. vol. 47, 1243–1253 (1993).

"Influence of . . . Method", Hosoya Et Al. J. Polym. Sci. vol. 31 2129–2141 (1993).

"Variation . . . Treatment", Okubo Et Al. Colloid: Poly. Sci. 272: 270–275 (1994).

FIG. 2  ■ Bar = 1 μm

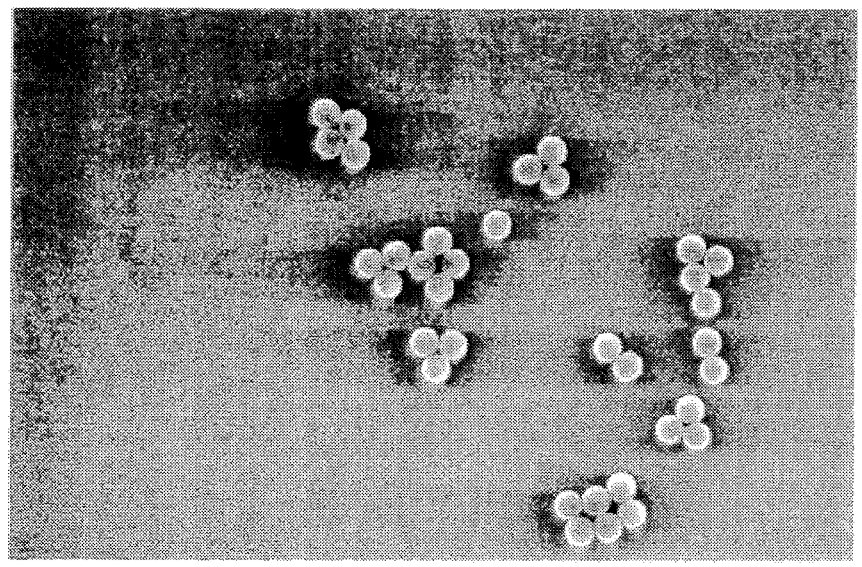
FIG. 4a  ▬ Bar = 10 μm
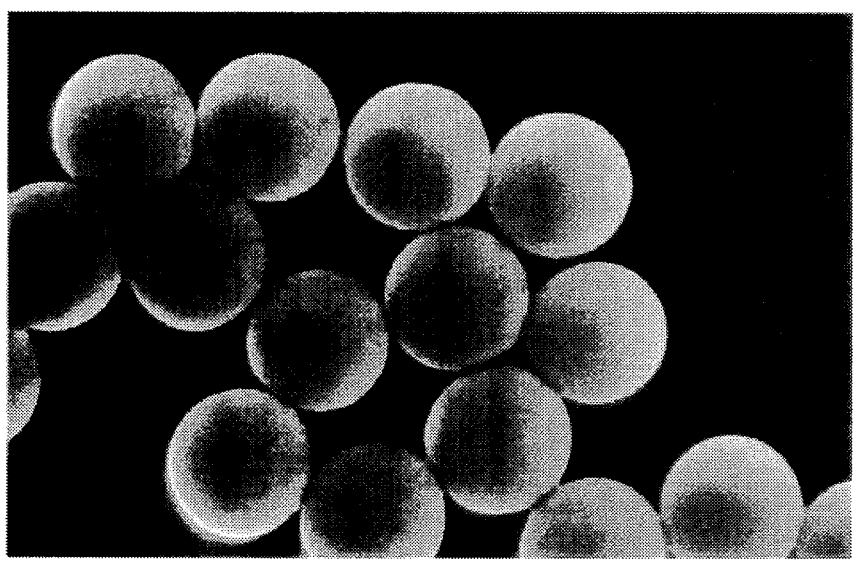
FIG. 4b  ▬ Bar = 1 μm

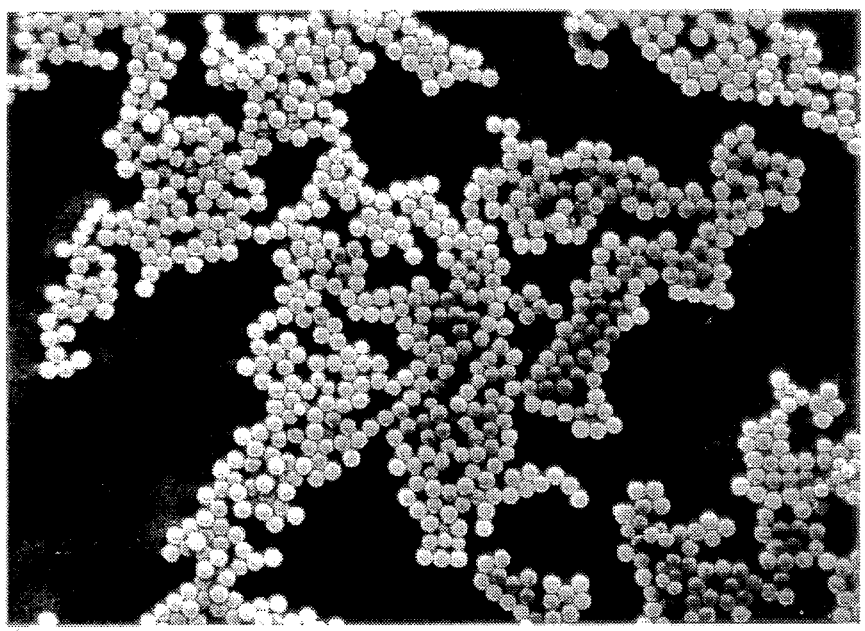
FIG. 7  Bar = 8 μm

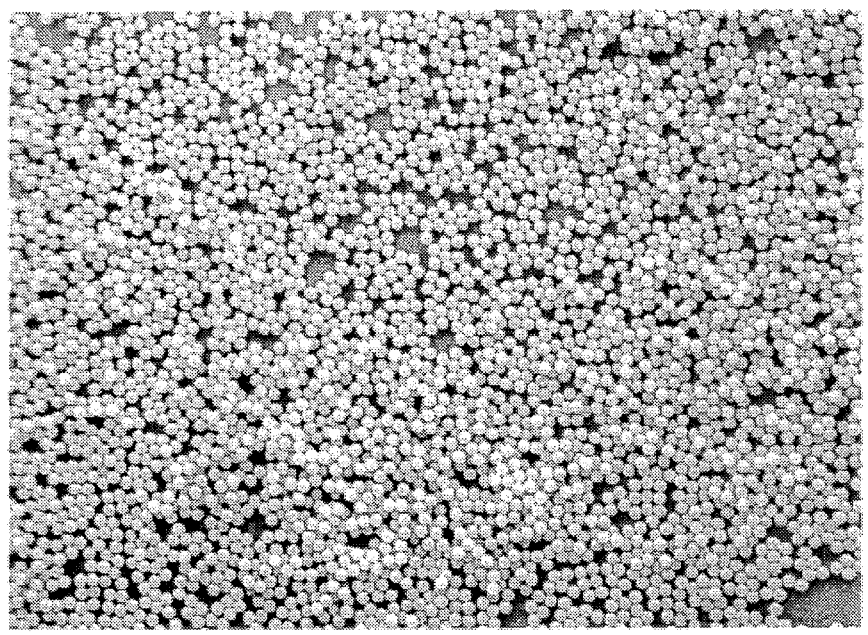
FIG. 10 ━ Bar = 16 μm

PARTICLE DIAMETER, MICRON

METHOD OF FORMING POLYMER MICROSPHERES

BACKGROUND OF THE INVENTION

1. Field of the Invention

The present invention relates to cross-linked polymer microspheres.

2. Description of the Related Art

Mono- or narrow-dispersed cross-linked polymer microspheres have gained increasing attention due to their uniform packing, providing a uniform flow velocity profile and low back-pressure for high efficiency chromatography.

However, currently available cross-linked polystyrene microspheres have somewhat limited applications, mainly due to the absence of available functional groups at the surface. They also require surfactants which are costly and may contaminate the surface as well as multiple swelling steps during manufacture of porous microspheres, which complicates the process.

Efforts continue to simplify and better control the manufacturing process, and to overcome the effects of 'coagulation' which is a chemical process known to be a primary cause of failure in the attempt of forming superior monodisperse microspheres.

Coagulation is the process by which a droplet of an immiscible additive collects or coagulates with other droplets of the same additive to reduce the collective exposed surface area of the droplets to the medium. This phenomenon is commonly seen, for example, when oil droplets are added to water.

One conventional technique to form microspheres, known as suspension polymerization, utilizes a nonhomogeneous reaction mixture that involves a suspension of droplets in a immiscible liquid, such as water. In this case, the droplets themselves form individual polymerization reactors, with all the necessary components to form a single microsphere. However, this can occur only if the droplets are kept separate from one another during the final stages of polymerization. Coagulation during the final stages will adversely affect the dispersity characteristics of the resulting batch of microspheres (an 'assemblage') and perhaps the individual characteristics of the microspheres themselves.

Emulsion polymerization is able to provide mono-disperse cross-linked microspheres of up to about one micron diameter in a single step, or up to many microns in the so-called seeded swelling techniques, notably those pioneered by Ugelstad.

In a process known as dispersion copolymerization, the polymerization takes place in organic media and the strong tendency for microspheres to coagulate is reduced by the use of disperants (Li and Stöver J. Polym. Sci., Polym. Chem., 31, 2473, 1993). However, in all of the above processes, including suspension, emulsion, seeded emulsion and dispersion polymerization, the surface of the microspheres is contaminated by dispersant residues and other stabilizers, potentially limiting their end uses.

A recent technique known as precipitation polymerization was published by Li and Stöver J. Polym. Sci., Polym. Chem., 31, 3257 (1993), the subject matter of which is incorporated herein by reference. In this technique, the monomer is soluble in the polymerization medium while the polymer is insoluble and precipitates out of solution.

In contrast to the aforementioned dispersion copolymerization, this technique does not require the presence of any surfactants, dispersants or stabilizers whatsoever. However, the resulting microspheres, while mono-disperse and highly cross-linked still lack the necessary functional groups and porosity to broaden their end uses.

Narrow or mono-dispersed microspheres have gained particular favour as a separation medium in view of the massive surface areas that can be achieved by establishing a porous bulk structure or porous outer shell. The conventional method to prepare the porous styrene-type microspheres is by suspension polymerization of commercial divinylbenzene (DVB-55). Permanent porosity in the microspheres is created with the help of programs. However, microspheres prepared by suspension polymerization usually have broad particles size distributions, requiring size fractionation to remove the fine particles. Even after size fractionation, the microspheres are not mono-disperse, thus reducing their chromatography column efficiency and increasing the back pressure of the packed column.

Mono-dispersed, cross-linked, porous microspheres may be produced by seeded swelling techniques. However, this is a time consuming process, requiring the use of surfactants.

It is the object of the present invention to provide an improved precipitation polymerization technique to form both functional and porous microspheres.

SUMMARY OF THE INVENTION

Briefly stated, the invention involves a method of forming cross-linked polymer microspheres, comprising the steps of:

forming a reaction mixture essentially free or stabilizer and comprising a polymerization medium, a di-vinyl cross-linking agent, a functional co-monomer which is copolymerizable with the cross-linking agent and a radical initiator, with the cross-linking agent, the functional co-monomer and the initiator being soluble in the polymerization medium;

subjecting the reaction mixture to conditions selected to form microspheres with two modes of stabilization, a first being provided by cross-linking, and a second being provided by short stabilizing chains extending outwardly from the microspheres and into the medium, the stabilizing chains having a sufficient concentration of the functional co-monomer to have steric stability in the medium.

In another aspect of the present invention, there is provided a method of forming cross-linked polymer microspheres, comprising the steps of:

forming a reaction mixture essentially free of stabilizer and comprising a polymerization medium, a di-vinyl cross-linking agent, a radical initiator, and a porogen, with the cross-linking agent, the initiator and the porogen being soluble in the polymerization medium;

subjecting the reaction mixture to conditions selected to form porous microspheres.

in another aspect of the present invention, there is provided an assemblage cross-linked polymer microspheres, each of the microspheres having a polymer backbone incorporating a functional co-monomer, wherein the assemblage is essentially free of stabilizer.

In still another aspect of the present invention, there is provided an assemblage of cross-linked polymer microspheres, each of the microspheres having a polymer backbone incorporating a functional co-monomer, each of the microspheres further including short stabilizing chains, the short stabilizing chains also incorporating the functional co-monomer, wherein the assemblage is essentially free of stabilizer.

In still another aspect of the present invention, there is provided an assemblage of cross-linked polymer microspheres, each of the microspheres having a porous structure, wherein the assemblage is essentially free of stabilizer.

In still another aspect of the present invention, there is provided a method of forming cross-linked polymer microspheres, comprising the steps of:

forming a reaction mixture essentially free of stabilizer and comprising a polymerization medium, a di-vinyl cross-linking agent, a functional co-monomer which is copolymerizable with the cross-linking agent and a radical initiator, with the cross-linking agent, the functional co-monomer and the initiator being soluble in the polymerization medium;

subjecting the reaction mixture to conditions selected to form functional microspheres.

BRIEF DESCRIPTION OF THE DRAWINGS

Several preferred embodiments of the present invention will now be described, by way of example only, with reference to the appended drawings in which:

FIGS. 4a and 4b are SEM micrographs of poly(DVB-80-co-VBC) microspheres;

FIG. 7 is an SEM micrograph of poly(bis(vinylphenyl) ethane-co-vinylbenzyl chloride) microspheres;

FIG. 10 is an SEM micrograph of polyDVB-55 microspheres;

DESCRIPTION OF THE PREFERRED EMBODIMENTS

Figure 1:
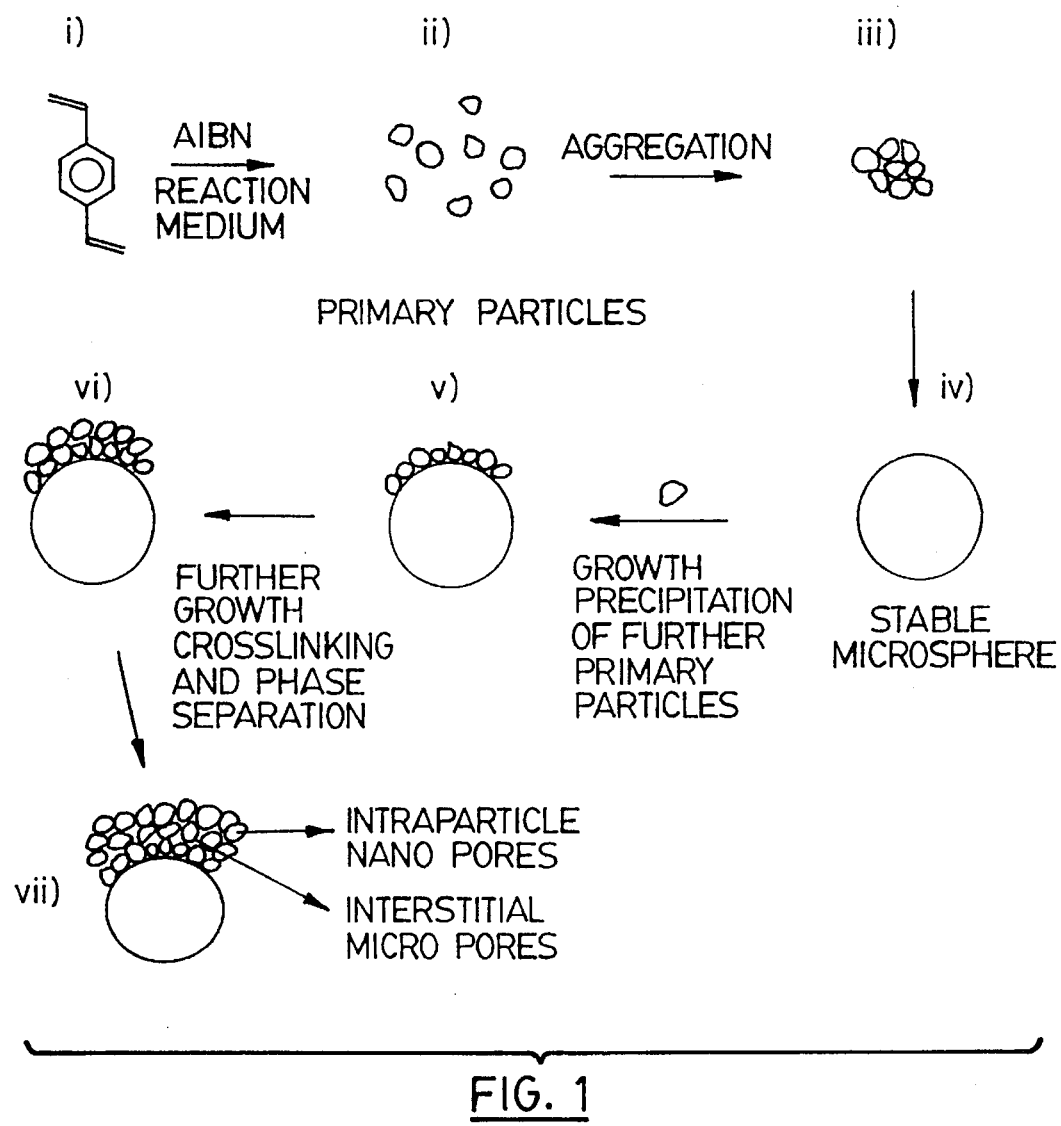
FIG. 1 is a theoretical schematic of a forming porous microsphere structure.

Reference herein below will be made to the following terms:

i) The term 'mono-disperse' as it applies to microspheres is intended to refer to an assemblage of microspheres having a coefficient of variation in particle size not exceeding 5 percent;

ii) The term 'narrow-disperse' as it applies to microspheres is intended to refer to an assemblage of microspheres having a coefficient of variation in particle size within the range from 5 to 10 percent;

iii) The term 'broadly-disperse' as it applies to microspheres is intended to refer to an assemblage of microspheres having a coefficient of variation in particle size of 10 percent or greater;

iv) The term 'functional group' is intended to refer to a chemically reactive group that includes oxygen, nitrogen, chlorine or other elements beyond carbon and hydrogen.

v) The terms 'steric stabilizer' and 'stabilizing chain' is intended to refer to a linear polymer affixed at one end to a microsphere structure surface allowing the main chain to be solvated by the surrounding medium. The term 'short stabilizing chain', when used herein refers to stabilizing chains being about 2 to 50 monomer units long, preferably 2 to 20 monomer units long.

vi) The terms 'steric stabilization' and 'steric stability' are intended to refer to that which occurs when two particles having a collection of steric stabilizers encounter each other in solution, wherein the solvated stabilizing chains will overlap and create an osmotic force repelling the particles away from each other.

vii) The term 'Porogen' is intended to refer to compounds which are miscible with the cross-linking agent and functional co-monomer, if present, and which phase separate from the polymer network during cross-linking, leading to microscopic pockets of porogen within the final polymer matrix.

viii) The term 'stabilizer' in the context of 'microspheres essentially free of stabilizer' and 'stabilizer-free' is intended to refer to the absence of the following classes of well known stabilizers from the reaction mixture of the present technique:

i) ionic or nonionic surfactants used in emulsion polymerization;

ii) steric stabilizers such as polyvinylpyrrolidone and modified celluloses, used in suspension and dispersion polymerization;

iii) electrostatic stabilizers including those generated from ionic initiators during emulsion polymerization.

The supplemental steric stabilization provided in the present technique is believed to occur as a consequence of linear chains containing the functional co-monomer and not as a consequence of adding a stabilizer to the polymerization system.

ix) The term 'effective cross-linking agent concentration' is explained as follows: As well be described, DVB-55 is commercial grade of divinylbenzene and the '55' designation refers to 55 percent 'effective cross-linking agent concentration' in the form of divinylbenzenes with the remaining 45 percent being largely ethyl styrenes. This means that only 55 percent of the DVB-55 is effective cross-linking agent. The term 'effective cross-linking agent concentration' will thus be used herein below to refer to that proportion of the reaction mixture that represents cross-linking agent and, for example, will be 55 percent of the amount of DVB-55 present in the reaction mixture. (Similarly, DVB-80 has 80 percent divinylbenzene cross-linking agent, meaning that the effective cross-linking agent concentration of a reaction mixture using DVB-80 will correspondingly be 80 percent of the amount of DVB-80 present in the reaction mixture).

The present technique involves a method of forming cross-linked polymer microspheres, comprising the steps of:

forming a reaction mixture essentially free of stabilizer and comprising a polymerization medium, a di-vinyl cross-linking agent, a functional co-monomer which is copolymerizable with the cross-linking agent and a radical initiator, with the cross-linking agent, the functional co-monomer and the initiator being soluble in the polymerization medium;

subjecting the reaction mixture to conditions selected to form microspheres with two modes of stabilization, a first being provided by cross-linking, and a second being provided by short stabilizing chains extending outwardly from the microsphere and into the medium, the stabilizing chains having a sufficient concentration of the functional co-monomer to have steric stability in the medium.

The earlier papers by Li and Stover are believed to be representative of the conventional thinking in the art, that any addition of significant amount of co-monomer will reduce the stability of the cross-linked microspheres and lead to coagulation for two reasons:

i) the addition of co-monomer will reduce the effective cross-linking agent concentration and increases the distance between the cross-links in the polymer backbone. This will make the polymer network more prone to swelling, making the particles more sticky.

ii) some co-monomers are strongly polar and may cause coagulation in a less polar medium.

In their earlier papers, Li and Stover demonstrated that the addition of a co-monomer in a polymerization medium will cause the resulting cross-linked microsphere structure to become more flexible. For example, the use of DVB-5 (produced by adding 4-methylstyrene, a mono-vinyl compound, to DVB-55) will result in one cross link in every twenty units of the backbone, DVB-30 one in three, DVB-55 about one in every two and so on. The addition of co-monomer therefore will increase the length of the backbone between cross-links, in effect causing this increase in flexibility. The resulting microsphere structure is more flexible or sticky and conventional thinking suggests that this microsphere structure has a greater tendency to coagulate with others.

While not intending to be bound by theory, it is believed that the present technique is based on the discovery that the addition of functional co-monomer does not necessarily reduce the stability of the microsphere structure and thereby cause coagulum. Rather, the addition of the functional co-monomer seems to establish a steric stabilization of the microsphere structure within the medium which offsets any loss in stability caused by the presence of the functional co-monomer in the cross-linked polymer backbone.

As the microsphere structure is formed using the present technique, it is believed that polymer chains are initially formed with a statistical profile influenced by the reactivity, as well as the proportion of, each constituent in the reaction mixture, namely the cross-linking agent, the mono-vinyl filler material included in the commercially available cross-linking agent and the functional co-monomer. These chains will randomly cross-link to begin the formation of a microsphere structure. This process will continue with polymer chains being formed and being cross-linked with those in the microsphere structure to increase its diameter.

However, there is believed to be an increasing number of short 'stabilizing chains' that are formed during this process, namely those with a sufficient concentration of functional co-monomer to have steric stability in the polymerization medium (in some cases at the higher end of the statistical concentration of functional co-monomer). These chains are referred to as short 'stabilizing chains' because they are believed to have a higher affinity for the medium than those chains with a relatively lower concentration of functional co-monomer. This higher affinity may be due to similarities between the functional co-monomer and solvent, namely polarity, polarizability and molecular size. These short 'stabilizing chains' are believed not to have the otherwise strong tendency to cross-link with the chains on the growing microsphere structure.

Instead, it is believed that these short 'stabilizing chains' extend into the medium providing the growing microsphere structure with a steric stabilizing layer. Therefore, these short stabilizing chains are believed to offset the loss in rigidity caused by the appearance of the functional co-monomer in the polymer backbone.

The present technique is believed to be in contrast to the stabilization known to be present in the conventional emulsifier-free emulsion polymerization system, wherein strongly polar end groups are formed throughout the polymerization and migrate to the surface of the microsphere structures to provide an electrostatic stabilizing layer. Instead, the level of steric stability offered by the functional co-monomer in the present technique is very weak in comparison with the conventional ionic stabilization in the emulsion polymerization system.

The present technique is also believed to be in contrast to classical steric stabilization which is provided by long surface bound chains with strong affinity for the medium. The short stabilizing chains according to the present technique are believed to be 2–50 monomer units long, depending on functional co-monomer fraction and reactivity. Classical steric stabilizers such as polyvinylpyrrolidone in contrast have chain lengths well in excess of 100 monomer units.

In the present technique, it is believed that only short stabilizing chains are required to provide supplementary steric stabilization since the highly cross-linked nature of the microsphere structures already provides the bulk of their stability, for the following reasons:

i) the rough surface microstructure inherent to precipitation polymerization reduces the contact area between approaching or contacting microspheres;

ii) the high rigidity of the cross-linked microspheres prevents any significant coagulation upon actual contact. This in turn prevents any significant reduction of surface area and thus reduces the driving force for coagulation.

Therefore, the present technique is believed to provide two modes of stabilization, the first provided by the presence of cross-linking throughout the polymer backbone, the second provided by the steric stabilization due to short stabilizing chains.

With the present technique, suitable reaction mixtures may include more polar co-solvents for more polar functional co-monomers such as acrylamide, glycidyl methacrylate and hydroxyethylmethacrylate. Suitable reaction mixtures may also include less polar co-solvents for less polar functional co-monomers such as alkylmethacrylates, alkylacrylates and higher vinyl ethers.

The polymerization medium in the present technique must also be a solvent for the functional co-monomer and yet be a non-solvent for the formed polymer and preferably includes a minimum 50 percent proportion of acetonitrile.

Another feature of the present technique is the selection of initiator which should be a radical initiator, preferably an azo- or peroxide-type initiator, the latter including those initiators commonly known by the following acronyms:

i) AIBN (2,2'-Azobis-(2-methylpropionitrile) available from Eastman Kodak Co.);

ii) BPO (Benzoylperoxide available from Aldrich Chemical Co., Inc.); and iii) ADVN (2,2'-Azobis-(2,4-dimethylvaleronitrile) available from Polyscience, Inc.).

Another feature of the present technique is that the cross-linking agent should be a di-vinyl cross-linking agent, including those known by the following acronyms:

i) DVB-55 (available from Aldrich Chemical Co., Inc. and Dow Chemicals);

ii DVB-80 (available from Fluka Chemicals, Inc.); and iii) BVPE (prepared by McMaster University Department of Chemistry according to the procedure set out in Li et al. J. Polym. Sci.: Part A: Polym. Chem., Vol. 32, 2023–2027 (1994)

As mentioned earlier, the functional co-monomer in the present technique must be selected to be copolymerizable with the cross-linking agent and must be soluble in the polymerization medium and may include, among others:

i) styrene derivatives such as vinylbenzylchloride (VBC);

ii) acrylics such as acrylamides, glycidyl methacrylate (GMA); alkyl methacrylates and alkylacrylates;

iii) vinyl acetate or vinyl ethers; and iv) maleic anhydride and maleimides.

In a preferred embodiment as will be explained, the cross-linking agent is divinylbenzene with an effective cross-linking agent concentration of about 54 percent to 44 percent relative to total monomer and the functional co-monomer is vinylbenzylchloride at a range of about 1 to about 20 percent relative to total monomer.

In another preferred embodiment, the functional co-monomer is glycidyl methacrylate and the cross-linking agent is divinylbenzene and has an effective cross-linking agent concentration above approximately 50 percent, the initiator being 2,2'-Azobis-(2-methylpropionitrile with a concentration below about 20 percent.

In yet another preferred embodiment, the functional co-monomer is glycidyl methacrylate and the cross-linking agent is divinylbenzene and has an effective cross-linking agent concentration above approximately 35 percent, the initiator being 2,2'-Azobis-(2-methylpropionitrile) with a concentration below about 20 percent.

In still another embodiment, the functional co-monomer is vinylbenzyl chloride and the cross-linking agent is divinylbenzene with an effective cross-linking agent concentration from 80 percent to 10 percent.

In yet another preferred embodiment, the polymerization medium includes a co-solvent, for example:

i) water at a range from about 1 to about 7 percent by volume relative to the reaction mixture, or alternatively ii) propionitrile at a range from about 1 to about 60 percent by volume relative to the reaction mixture.

The method to prepare functional microspheres is based on the precipitation polymerization of di-vinyl cross-linking agents in a homogenous solution. A typical polymerization would involve a 2 volume percent solution of DVB-55 in neat acetonitrile, the mixture held in small polymer bottles perhaps ranging in size from 30 to 1000 mL being gently rotated around their long axis to prevent sedimentation of the forming sticky microspheres structure and subsequent coagulation. 2 weight percent AIBN (relative to total monomer) may be conveniently used as initiator. The reaction temperature is raised from 20 degrees to 70 degrees Celsius during a period of 2 hours and then held at 70 degrees Celsius for 24 hours. At the end of the reaction, the particles are separated by centrifugation or by vacuum filtration, washed repeatedly with ethanol and tetrahydrofuran and dried. Typical conversions are between 40 and 60 percent largely due to the very low monomer and initiator concentrations.

Conversions of up to 85 percent may be achieved using either a higher monomer loading (5 percent) or using semi-batch processes involving addition of further cross-linking agent and initiator throughout the polymerization so as to keep the monomer and initiator loading at their initial levels.

A preferred polymerization (in a bulk single batch process) makes use of DVB-55 in a range of about 99 percent to 80 percent and VBC in a range of about 1 to 20 percent, the total monomer being 2 volume percent relative to the reaction mixture, and with a small percentage of AIBN initiator, namely about 2 weight percent (relative to total monomer).

A preferred semi-batch polymerization may be employed to form stabilizer-free microspheres with a DVB-55 rich core by using the bulk single batch process described above with a functional co-monomer-rich shell:

i) using DVB-55 in a range of about 99 percent to 80 percent and VBC in a range of about 1 to 20 percent, the total monomer being 2 volume percent relative to the reaction mixture, and with a small percentage of AIBN initiator; or ii) using DVB-80 in a range of about 99 percent to 50 percent and VBC in a range of about 1 to 50 percent, the total monomer being 2 volume percent relative to the reaction mixture, and with a small percentage of AIBN initiator; or If desired, the level of functionality throughout the shells of the forming microsphere structure may also be varied by semi-batch processing, namely by adding a functional co-monomer-cross-linking agent-initiator mixture part way through the polymerization process, corresponding to the shell in which the functional group is to be located.

In another aspect, the method involves forming cross-linked polymer microspheres, comprising the steps of:

forming a reaction mixture essentially free of stabilizer and comprising a polymerization medium, a di-vinyl cross-linking agent, a radical initiator, and a porogen, with the cross-linking agent, the initiator and the porogen being soluble in the polymerization medium;

subjecting the reaction mixture to conditions selected to form porous microspheres.

In a preferred embodiment, the porogen is toluene at a level not exceeding 40 percent by volume of the reaction mixture.

In another preferred embodiment the microspheres have a porosity characterized by total pore volume, pore size distribution and surface area, the method further comprising the step of controlling the proportion of the porogen to control the porosity.

As will be described below, the porogen should have a solubility sufficient to raise the solubility of the medium to raise the molecular weight at which forming primary particles precipitate out of solution, whereby the microspheres have two types of porosity, a first of which is formed by interstitial volumes between the primary particles and a second of which is formed by phase separation caused by cross-linking of the primary particles.

Conventional thinking is that neat toluene not only is a good solvent for styrene type polymers (such as polyDVB), but also that toluene during the formation of microspheres (using the precipitation polymerization route) would lead to failure. This is due to the widely held belief that toluene would partition from the medium into the forming microsphere structure, making it expand and become more sticky, thereby promoting coagulation.

FIG. 1 is intended to provide a step-wise illustration of the formation of porous microspheres according to the present technique. The stations i) to v) are believed to be well known in the art of precipitation polymerization and will be briefly described. Polymerization is initiated in a homogenous solution and cross-linking agent-rich oligomers are formed. These cross-linking agent-rich oligomers, once grown to a size exceeding their solubility limit, precipitate out to form the primary particles shown at station ii). A number of these primary particles aggregate (as shown at station iii) to form the first stable microsphere structures shown at station iv) (this may for example occur within an hour after the onset of the reaction). The total number of microspheres is fixed at this point. Subsequently, oligomers formed in solution and precipitating out will be absorbed onto the surface of the microsphere structures instead of forming new microspheres, but rather leading to the growth of these original microsphere structures into microspheres as at station v).

While not intending to be bound by theory, it is believed that the present technique is based on the discovery that porogens do not necessarily lead to coagulation but rather seem to increase the solubility of the medium to provide larger uniform primary particles. Referring to FIG. 1, stations vi) and vii), as subsequent layers of primary particles are deposited on the growing microspheres, it is believed that continued cross-linking within each of these deposited layers leads to the build up of porosity by two mechanisms:

i) the formation of interstitial volumes between the polymerization medium-swollen particles precipitated onto the surface of the growing microsphere structures; and ii) continued cross-linking and phase separation within each primary particle.

These two processes are believed to lead to two distinct types of porosity, as will be discussed below, one being the interstitial porosity which is relatively large in individual size, but with a very narrow pore size distribution, the second being the intraparticle porosity which is relatively small in individual size but with a broad pore size distribution.

The method to prepare porous microspheres is also based on the precipitation polymerization of di-vinyl cross-linking agents in a homogenous solution. A typical polymerization would involve a 2 volume percent solution of DVB-55 in neat acetonitrile, the mixture held in small polymer bottles perhaps ranging in size from 30 to 1000 mL being gently rotated around their long axis to prevent sedimentation of the forming sticky microspheres structure and subsequent coagulation. 2 weight percent AIBN (relative to total monomer) may be conveniently used as initiator. The reaction temperature is raised from room temperature to 70 degrees Celsius during a period of 2 hours and then held at 70 degrees Celsius for 24 hours. At the end of the reaction, the particles are separated by centrifugation or by vacuum filtration, washed repeatedly with ethanol and tetrahydrofuran and dried, with solvated polymer being gravimetrically calculated from the remaining reaction mixture. Typical conversions are between 40 and 70 percent largely due to the very low monomer and initiator concentrations.

While the processes to form functional microspheres and porous microspheres have been described separately, they may be in fact incorporated into a single process, wherein functional groups and pores are introduced into the microspheres. In this case, the steps undertaken to make porous particles may be used, except for replacing the di-vinyl cross-linking agent with a mixture of di-vinyl cross-linking agent and functional co-monomer, preferably toluene together with VBC. However, other porogens and functional co-monomers may be appropriate, provided that the porogens do not interfere with the two mechanisms of particle stabilization, such as might occur with a porogen having a significantly higher solubility than toluene.

It should be understood that while the above description has dealt with mono- and narrow dispersed microspheres, the present technique may also be used to produce broadly dispersed microspheres. This may be achieved, for example, with higher monomer loading or by the use of a conventional polymerization reactor involving an overhead paddle stirrer to strengthen the agitation of the reaction mixture. In all three cases, the stabilizer-free structure of the microspheres gives rise to numerous potential applications including separation media for mono-dispersed microspheres and selective absorbants for narrow- and broadly-dispersed porous microspheres.

Embodiments of the present invention will be described with reference to the following Examples which are presented for illustrative purposes only and are not intended to limit the scope of the invention.

EXAMPLE 1

The apparatus involved a number of reactor vessels held in a grid-plate rotor and submerged in a water bath. The rotor plate was changeable in order to vary the size of the reactor vessels from 30 mL up to 1000 mL. In most of the cases, HDPE or PP bottles were used as reactor vessels.

Typically, for 30 mL HDPE bottles, the polymerization medium, cross-linking agent, functional co-monomer and initiator were added to each bottle, with up to 12 reactor bottles horizontally attached to the grid-plate rotor for polymerization under common conditions. All the experiments were carried out with a grid plate rotating speed of about 30 rpm. The temperature of the water bath was raised from room temperature to 70° C. in about 2 hours, and then kept at 70° C. for 24 hours.

Another reactor involved a glass tube closed at one end and rotated at an angle of 15 degrees with the lower, closed end submerged in a thermostatic bath. The upper section of the glass tube was cooled to avoid loss of solvent, while the open end of the tube could be used for semi-batch addition of cross-linking agent and initiator, as well as removal of samples at different points during the reaction. The glass tube was rotated by means of a Büchi rotary evaporator assembly.

Still another reactor involved an apparatus having a set of parallel, internally heated steel rollers in an enclosed cabinet. In this case, the heating current to the rollers was controlled by a thermocouple and temperature controller.

Still another reactor involved a jacketed 1 liter glass reaction vessel fitted with an overhead paddle stirrer and having temperature controlled water circulating through the outer glass jacket.

For work-up, the microspheres were then separated from the reaction mixture, successively washed three times with tetrahydofuran, ethanol, acetone and then dried in a vacuum oven at 50° C.

Neat Acetonitrile and AIBN were used as solvent and initiator, respectively. DVB-55, DVB-80 and BVPE (1,2-bis(vinylphenyl) ethane) were employed as cross-linking reagents. The functional co-monomers used were vinylbenzyl chloride (VBC) and glycidyl methacrylate (GMA). Total combined initial monomer concentration (ie. cross-linking agent and functional co-monomer) used was between 1 and 20 volume percent, preferably between 2 and 5 volume percent. The AIBN concentration was held between 1 and 30 weight percent (relative to total monomer), preferably 2 weight percent, relative to the applicable cross-linking agent. The reaction equations are shown by equations (1), (2) and (3) and are described under separate headings below.

a. Poly (DVB-80-co-Glycidyl Methacrylate)

Table 1 shows the results of the precipitation copolymerization of divinylbenzene (DVB-80) and glycidyl methacrylate (GMA). In this example, the effect of cross-linking agent concentration on the poly (DVB-80-co-GMA) microspheres was studied by varying the fraction of GMA.

The diameters of the copolymer microsphere structures increased with decreasing effective cross-linking agent concentration. Mono-dispersity was preserved down to an effective cross-linking agent concentration of 55 percent. Narrow size distributions were seen at effective cross-linking agent concentrations of 50 and 45 percent. Bimodal, broad particle size distributions were observed at effective cross-linking agent concentrations of 40 and 35 percent. Bimodal distribution indicates the appearance of a second generation of particles that coexist with the first generation. This implies that each of these generations still has sufficient stabilization, even down to 35 percent effective cross-linking agent concentration. Formation of the second generation is simply caused by stabilization of forming oligomers before they could be captured by the existing first generation copolymer particles.

The particle size increase with increasing GMA content may be explained with an extension of the particle initiation phase. Particle stability for the first generation is achieved slightly later, for example within one hour, allowing for a higher degree of coagulation amongst the original polymer particles reducing their number in solution. The particle number in solution becomes fixed once the particles are stabilized against coagulation. During the initial stages of polymerization, the particle number rises to a maximum and then decreases by coagulation until the particles are sufficiently cross-linked enough to be stabilized against coagulation. If this point is delayed, due to the presence of higher GMA fraction, the original particles have more time to coagulate hence reducing the final number of particles.

No coagulation was observed when the effective cross-linking agent concentration was reduced down to 35 percent of total monomer, although the size distribution was broad or even bimodal. The overall monomer conversion was low, namely between 42 and 45 percent, due to the low total monomer loading of 2 percent.

The effect of initiator proportion on the polymerization was examined by varying the fraction of initiator. The recipe for run FM10a-5 (that is 60 percent effective cross-linking agent concentration and 25 percent of GMA co-monomer) was used in this study. As seen in table 2, with increasing initial amount of AIBN, both particle size and conversion increased simultaneously.

The increase in conversion may be understood by considering that the overall monomer and initiator loading at the onset was low leading to rather low initiator efficiencies and hence short kinetic chain lengths.

The higher initiator concentration led to a higher initial concentration of reactive oligomer and hence to a higher degree of coagulation and lower particle number at the time stabilization is achieved. This trend continued until 20 weight percent of AIBN (relative to total monomer) was used. Bimodal distribution patterns of microsphere structures, that is mixtures of large microsphere structures with extremely small particles, were seen for AIBN concentrations from 20 weight percent to 30 weight percent (relative to total monomer). The lower yields for these runs were in part due to the loss of these tiny particles during work-up.

The use of 20 percent weight of AIBN relative to total monomer may be costly due to the higher cost of the initiator relative to monomer. However, the initiator residue is incorporated into the polymer structure and ends up as a nitrile group on the particle surface. This represents another set of functional particles since nitrile groups are used on certain chromatographic resins and can in principle also be converted into free amine or acid groups.

Figure 2:
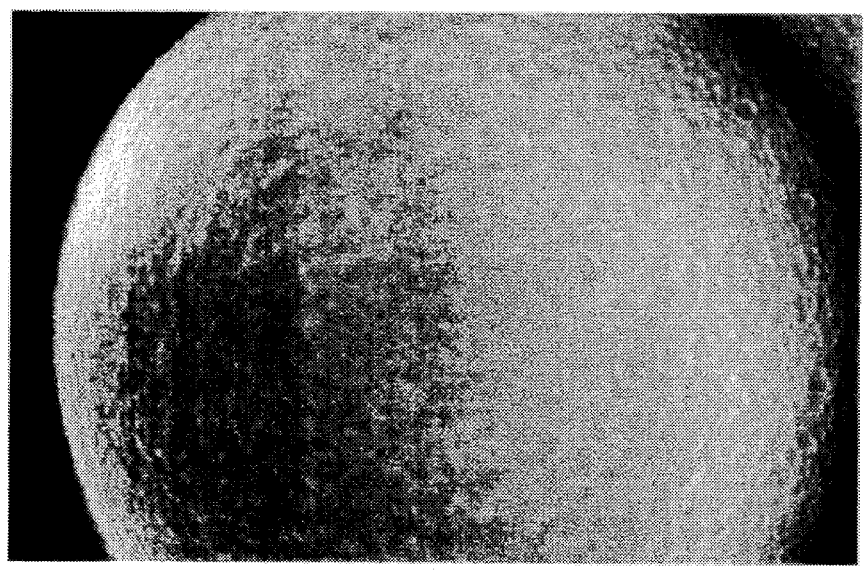
FIG. 2 is a photomicrograph of a poly(DVB-80-co-GMA) microsphere.

The surface morphology of poly (DVB-80-co-GMA) microspheres is illustrated in FIG. 2 which shows the absence of macro pores. The effect of the initiator concentration, as well as the surface morphology, are similar for both the PolyDVB-55 and PolyDVB-80 and in the presence of functional co-monomers.

b. Poly (DVB-80-co-vinylbenzyl chloride)

Figure 3:
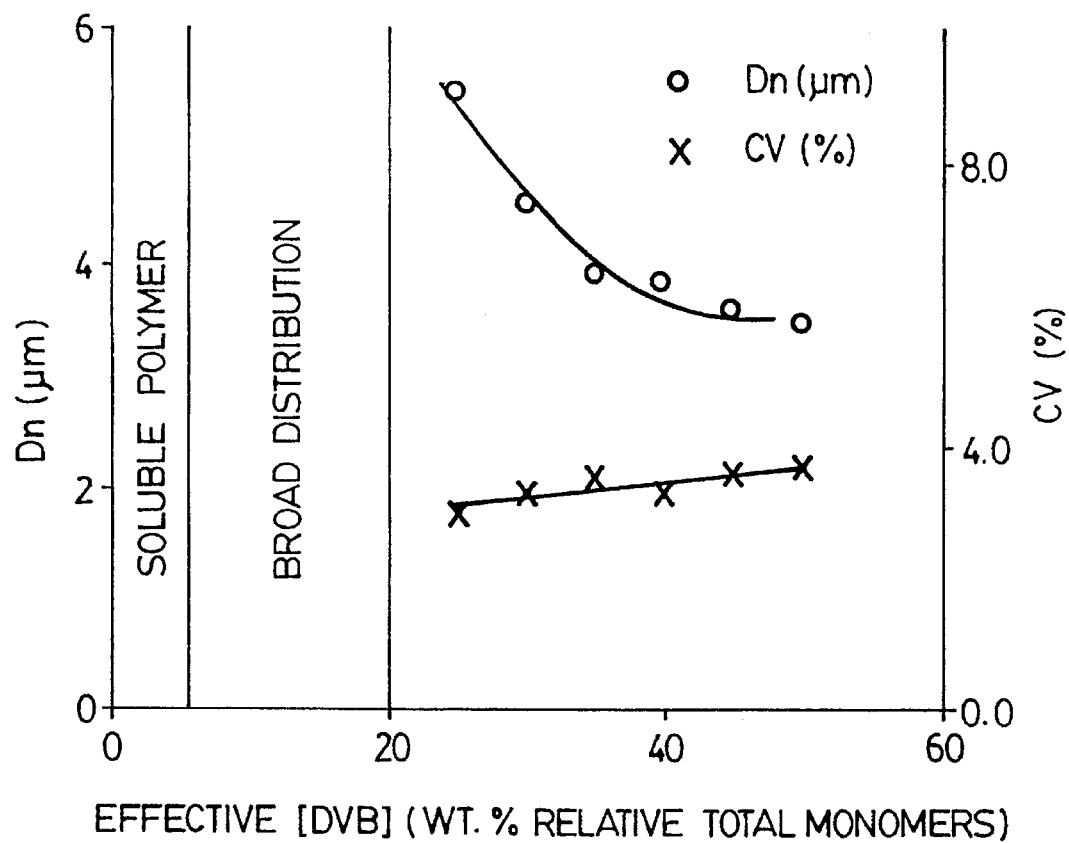
FIG. 3 is a graph showing the effects of cross-linking agent concentration on poly(DVB-80co-VBC) copolymer microspheres.

FIG. 3 shows the results of the precipitation copolymerization of divinylbenzene (DVB-80) and vinylbenzyl chloride. It is seen from FIG. 3 that mono-disperse polymer microspheres were obtained in the range of effective cross-linking agent concentration from 55 percent to 25 percent. Microspheres were still formed when the effective cross-linking agent concentration was as low as 10 percent. Below 5 percent, no solid particles were observed.

FIGS. 4a and 4b are SEM micrographs of poly(DVB-80-co-VBC) microspheres. It can be seen that the surfaces of these microspheres are rather smooth. Using reverse phase HPLC (on a Separon column with methanol/water (70/30, v/v) as eluent), it was found that the polymerization rate of vinylbenzyl chloride (VBC) was lower than that of either the para- or meta- isomers of divinylbenzene (DVB), however, higher than those of the para- or meta- isomers of ethylstyrene in the present technique.

Figure 5:
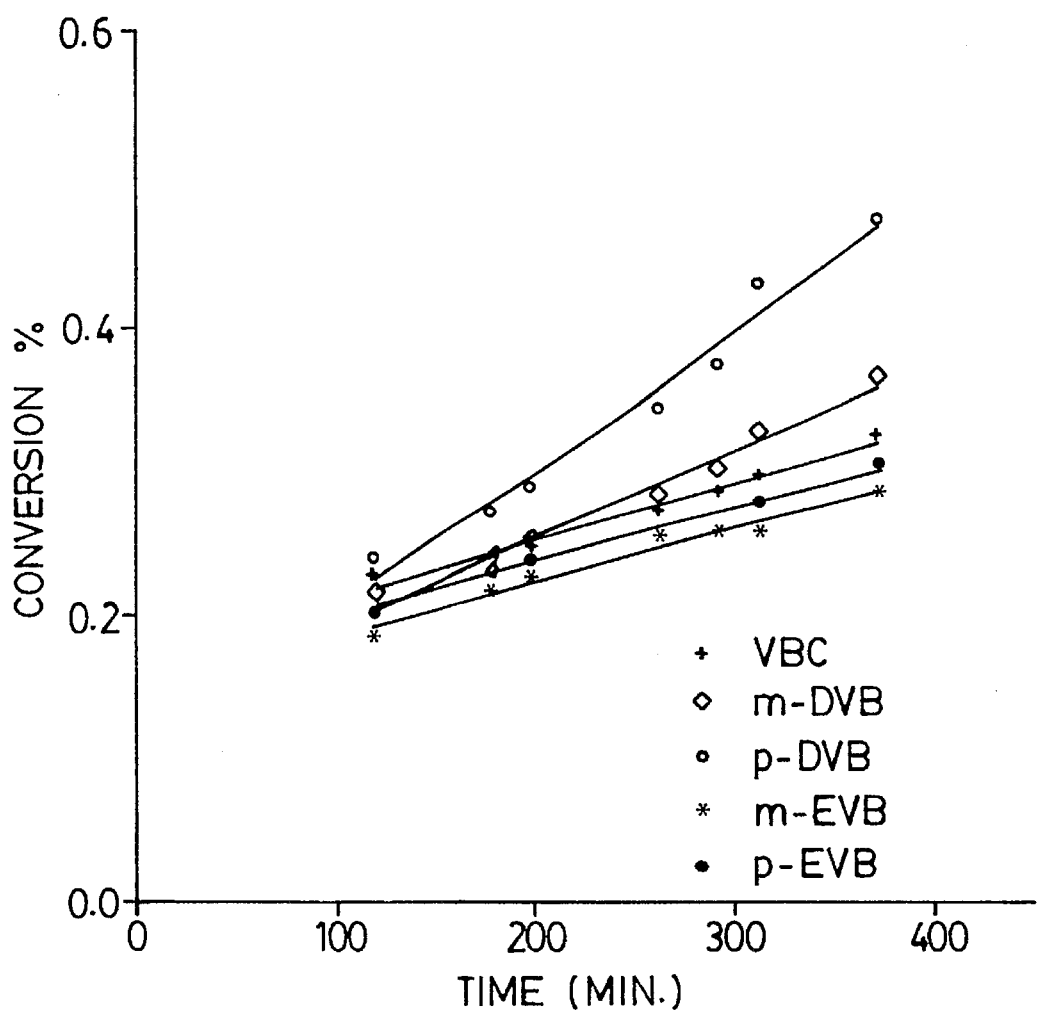
FIG. 5 is a Conversion-time plot of polymerization of DVB-80 and vinylbenzyl chloride.

FIG. 5 shows the conversion-time curve for each individual monomer in this system measured by reverse-phase HPLC. The differences in reaction rate of each monomer led to microspheres containing cores slightly rich in the para- or meta- isomers of DVB and shells (or surfaces) slightly rich in the para- or meta- isomers of EVB and VBC. The slight enrichment of VBC in the outer layer of the microspheres may stabilize the forming poly(DVB-80-co-VBC) microspheres. As described above, VBC rich surface chains are believed to contribute to the stabilization of the microsphere.

Figure 6:
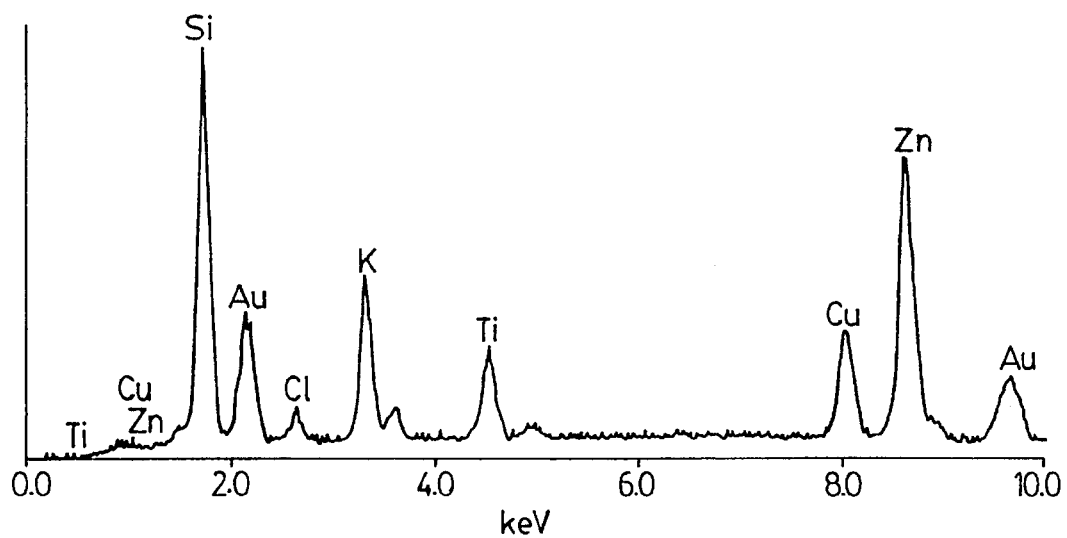
FIG. 6 is a spectrum of X-ray microanalysis for poly-(DVB-80-co-VBC) microspheres.

Referring to FIG. 6 the introduction of chloromethyl groups into the microspheres was confirmed by surface analysis using X-ray microanalysis.

c. Poly(DVB-55-co-VinylbenzylChloride)

Figure 6A:
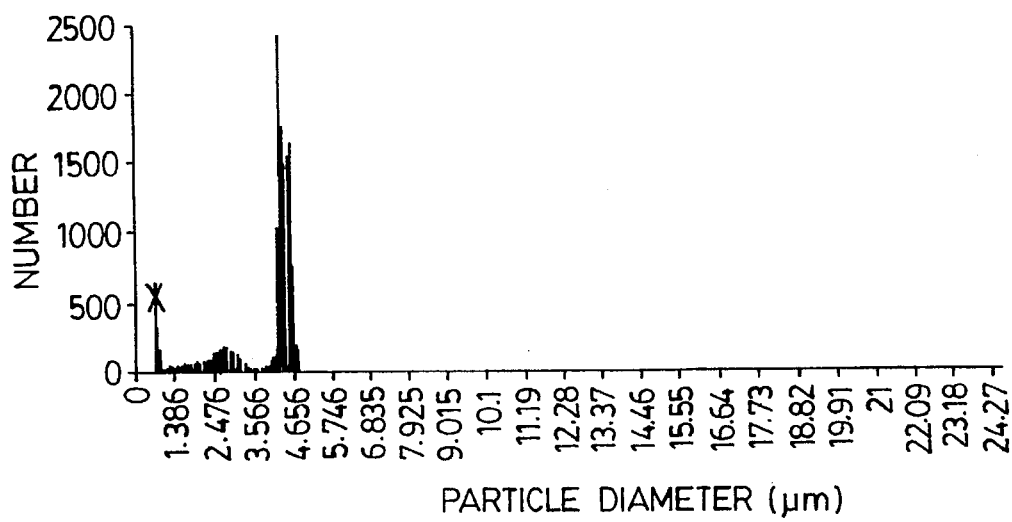
FIG. 6a to 6c are plots of particle size distributions for poly(DVB-55-co-VBC) microspheres.
Figure 6B:
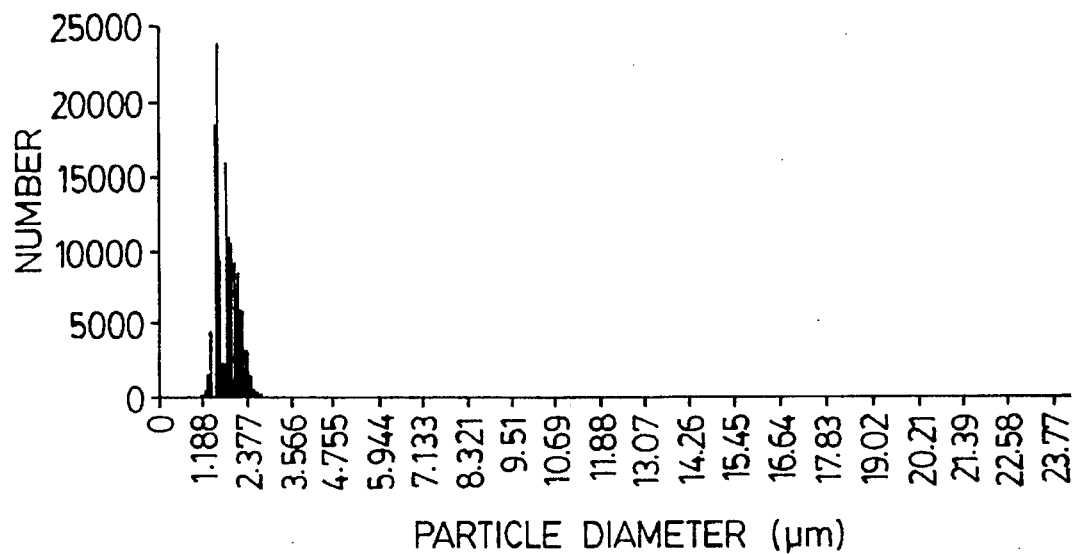
Figure 6C:
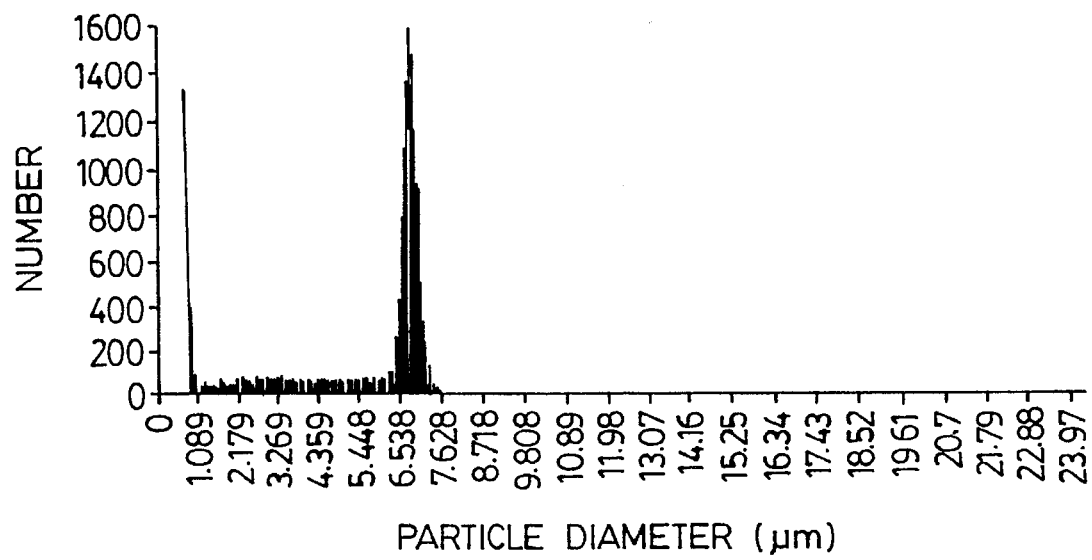

FIGS. 6a, 6b and 6c show the particle size distributions obtained in the precipitation copolymerization of divinylbenzene (DVB-55) and vinylbenzyl chloride, covering DVB-55 to VBC ratios of 80:20, 40:60, and 20:80 respectively. Each run involved a heated roller grill with the total monomer loading of 2 volume percent and the initiator concentration at 2 weight percent total monomer. Particle size and coefficients of variation were measured using a 256-channel COULTER MULTISIZER II with ISOTON II as electrolyte. An orifice tube with an aperture of 30 μm was used for all measurements. The particle sizes and the coefficients of variation (referring to the major peak in each of FIGS. 6a to 6c) are as follows:

DVB-55:VBC i) 80:20 Particle Size=4.35 μm, CV=3.9%;

ii) 40:60 Particle Size=1.80 μm, CV=16.6%;

iii) 20:80 Particle Size=6.79 μm, CV=3.5%;

In FIGS. 6a and 6b, the sharp peak at 0.6 μm diameter was due to electronic noise. The broad peak around 2.5 μm diameter in FIG. 6a, as well as the small particle band in FIG. 6c were due to secondary initiations. The incidence of these secondary initiations in FIG. 6a, was due to local overheating in the heated roller grill used in this process and can be reduced by improving the temperature control. On the other hand, these secondary initiations shown in FIG. 6b are believed to be due to the low effective cross-linking agent concentration, and may be reduced by carrying out the polymerization at lower temperature.

These results indicate that stable polymer microspheres can be obtained over a range of DVB-55:VBC ratios. The particle size distributions shown in FIGS. 6a to 6c do not appear to correlate well with the DVB-55:VBC ratios. This is believed to be due to the varying amounts of secondary initiations and may be overcome by improved temperature control.

d Poly(Bis(Vinylphenyl)Ethane-co-VinylbenzylChloride)

The stability of PolyDVB-55 or PolyDVB-80 microspheres is due in part to their highly cross-linked structure. In principle, this should be applicable not only for DVB cross-linking agent but also other types of styryl cross-linking agent. To test this hypothesis, polymer microspheres containing chloromethyl groups were synthesized by copolymerization of bis(vinylphenyl) ethane (BVPE) and vinylbenzyl chloride.

Copolymerization was carried out with 2 mol percent total monomer loading of BVPE and VBC in acetonitrile, 2 weight percent AIBN (relative to total monomer), at 70 degrees Celsius for 24 hours. FIG. 7 shows an SEM micrograph of poly(bis(vinylphenyl) ethane-co-vinylbenzyl chloride) microspheres, formed in a reaction mixture including BVPE and VBC (at 50/50 weight percent ratio), a neat acetonitrile polymerization medium, 2 weight percent AIBN (relative to total monomer), at 70 degrees Celsius for 24 hours. Nearly mono-disperse poly(BVPE-co-VBC) microspheres were obtained as shown in FIG. 7. This result indicated that the synthesis of mono-disperse polymer microsphere structures by precipitation polymerization may be carried out for other divinyl cross-linking agents as well.

EXAMPLE 2

The following examples were carried out using the methodology set out for EXAMPLE 1 to investigate the affect of co-solvents on the diameter and distribution of polymer microspheres.

As will be discussed, co-solvents such as propionitrile and water significantly decrease the particle size but lead to an increase in particle size distribution. In other words, co-solvents may give control over particle size.

It is also believed that the coefficient of variation may be reduced by reducing temperature and the monomer loadings.

a. Water as Co-solvent

Water was added to acetonitrile medium for the polymerization of 2 percent DVB-55 to determine the effect of a very polar co-solvent on the resulting microspheres.

Figure 8:
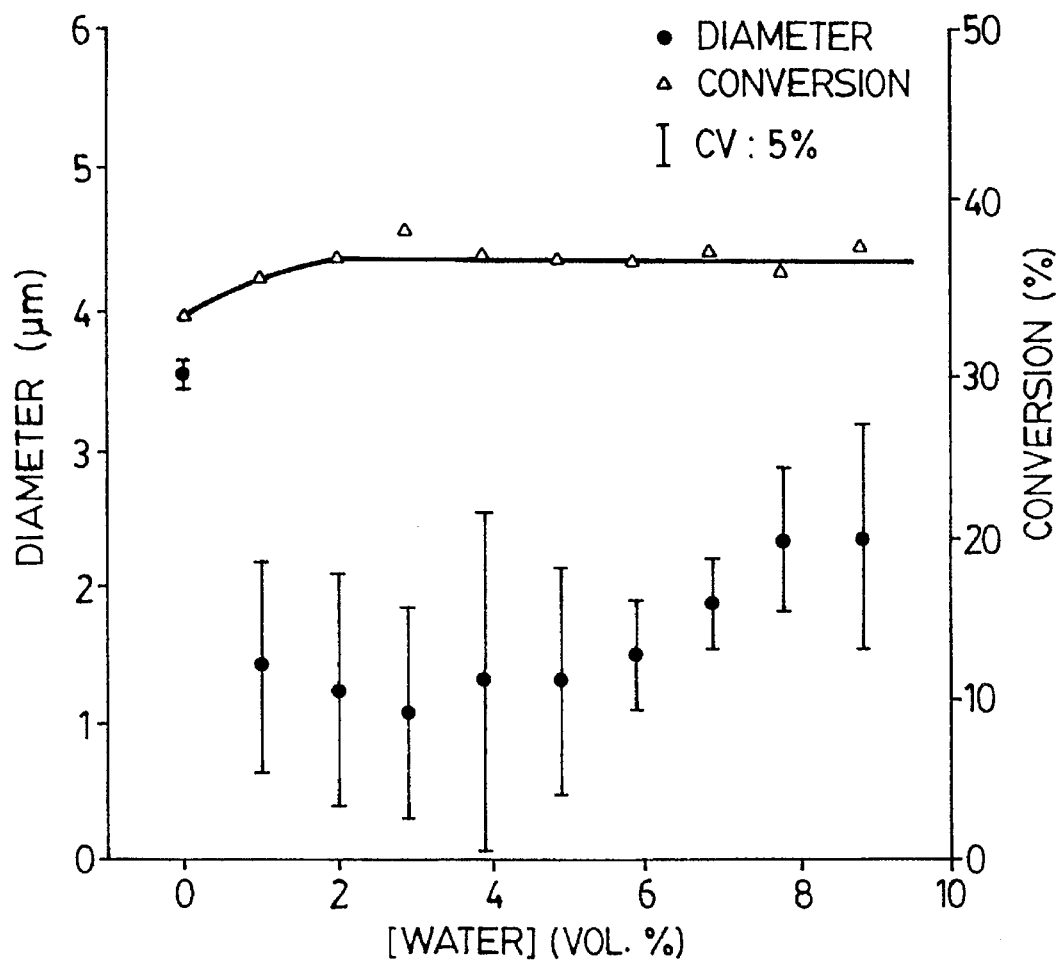
FIG. 8 is a plot of diameter versus water content in acetonitrile for polyDVB-55 microspheres.

Referring to FIG. 8, the addition of 1 percent of water caused a decrease in particle diameter from 3.5 to 1.5 μm, accompanied by a substantial increase in molecular weight distribution. Further addition of water eventually led to a narrowing of the particle size distribution accompanied by an increase in particle size diameter. Specifically, a 7 percent water proportion in acetonitrile produced microspheres having a 1.8 μm diameter with a particle size distribution in the order of 10 percent.

b. Propionitrile as Co-solvent

Propionitrile was added to the acetonitrile in proportions varying from 1 to 60 percent by volume relative to the reaction mixture for the polymerization of 2 percent DVB-55 to determine the effect of a co-solvent having very similar properties to acetonitrile on the resulting microspheres.

Figure 9:
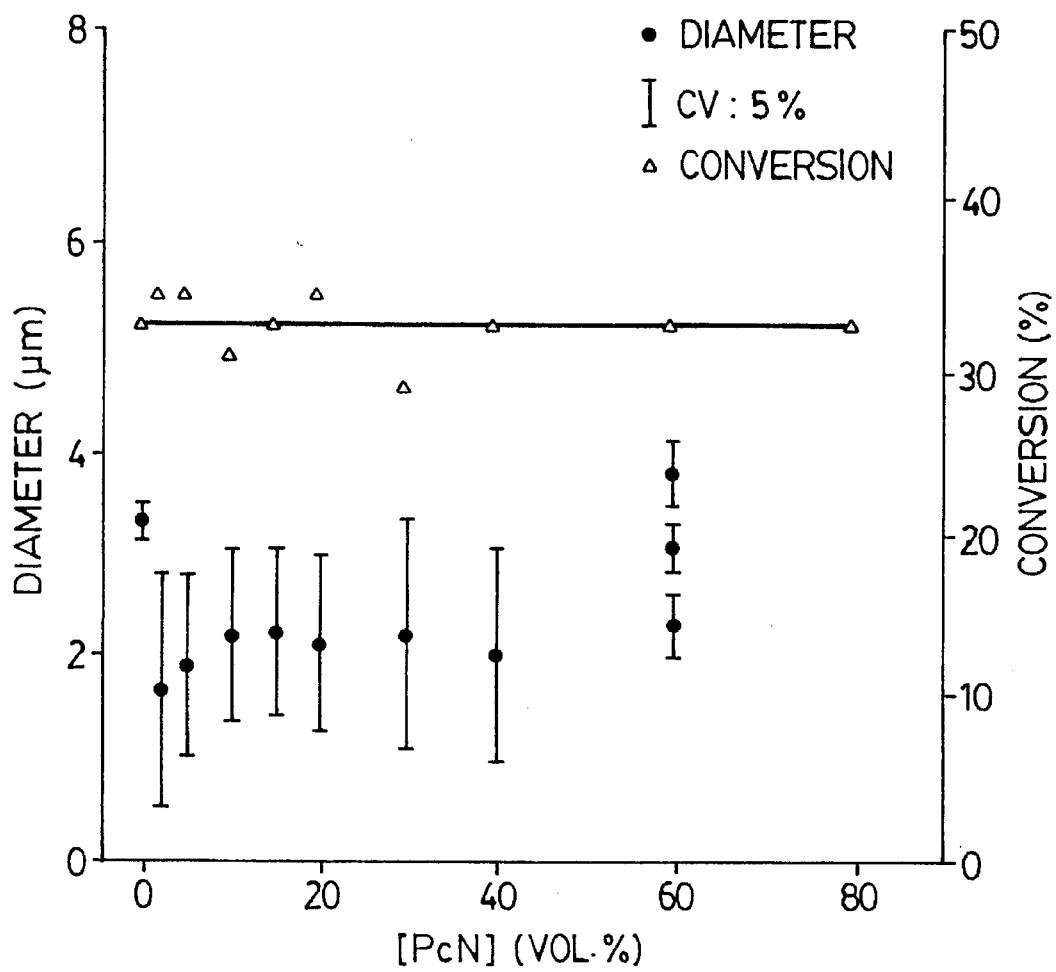
FIG. 9 is a plot of diameter versus propionitrile content in acetonitrile for polyDVB-55 microspheres.
Figure 11A:
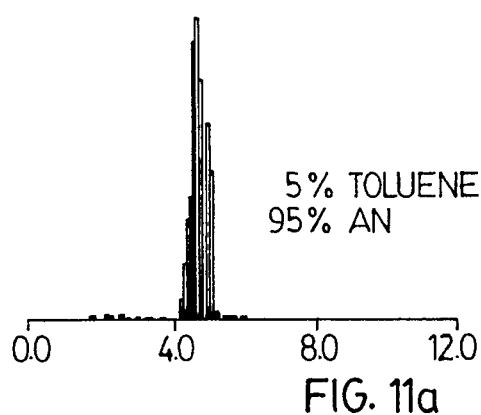
FIG. 11 is a size distribution of polyDVB-55 microspheres as a fraction of toluene volume fraction.
Figure 11B:
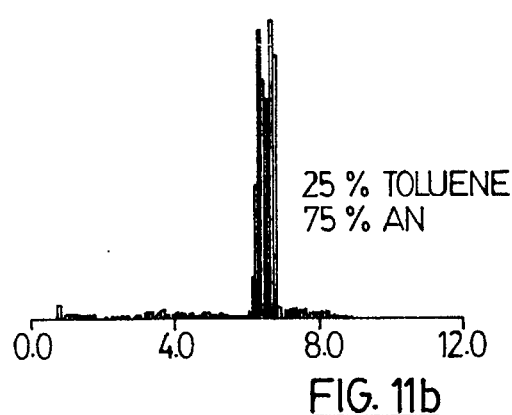
Figure 11C:
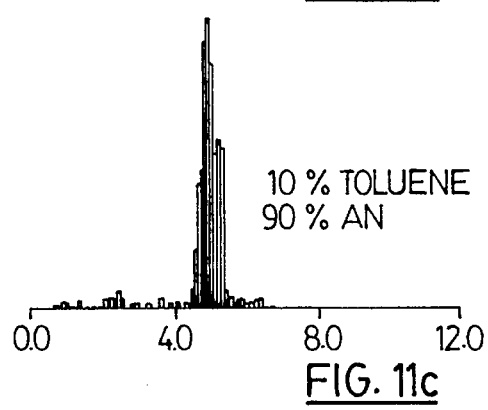
Figure 11D:
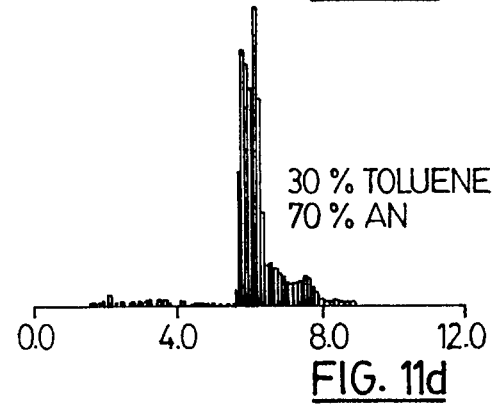
Figure 11E:
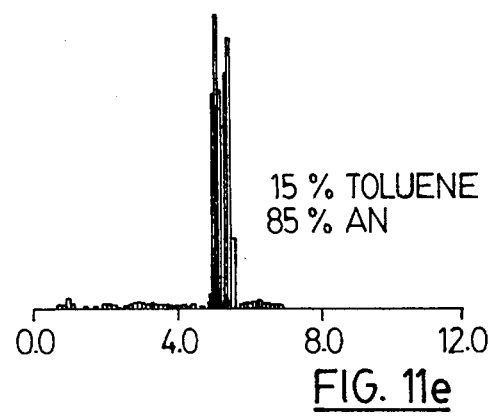
Figure 11F:
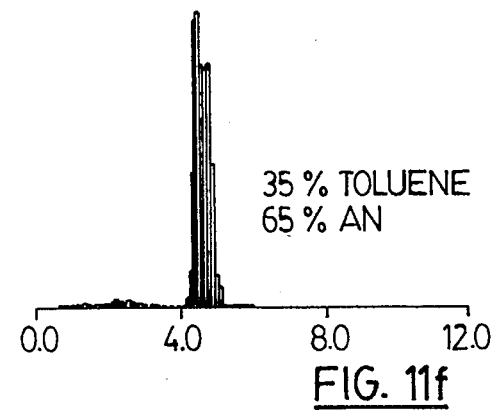
Figure 11G:
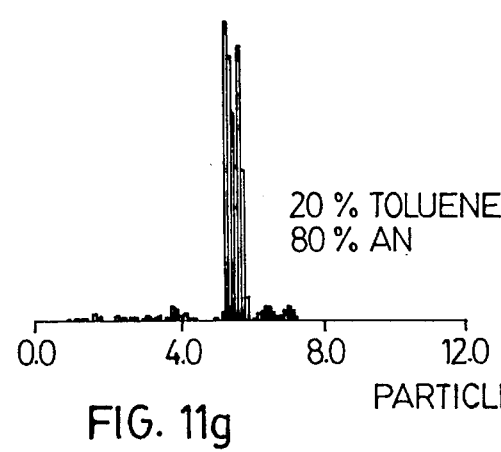
Figure 11H:
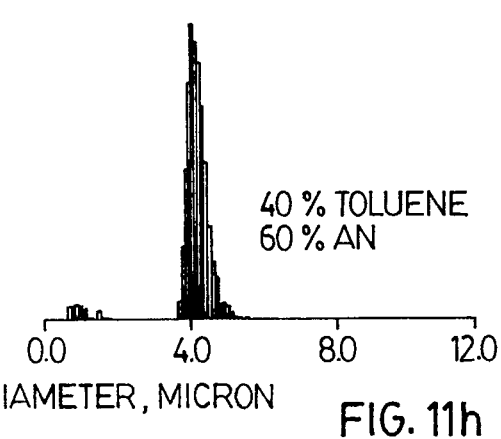
Figure 12A:
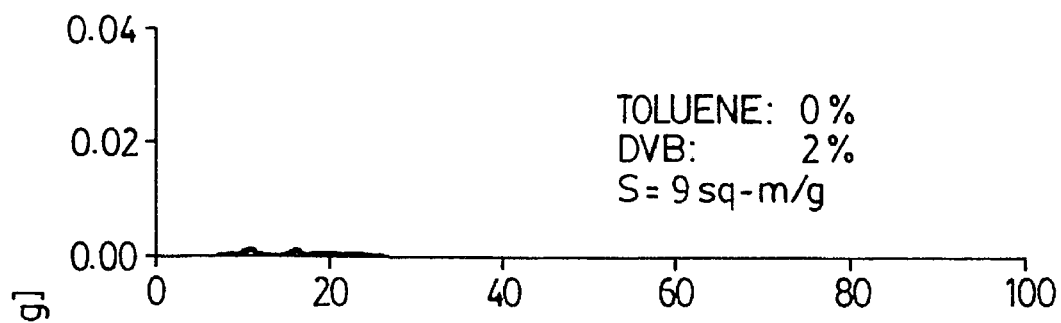
FIG. 12 is a pore size distribution of polyDVB-55 microspheres, as a fraction of toluene volume fraction.
Figure 12B:
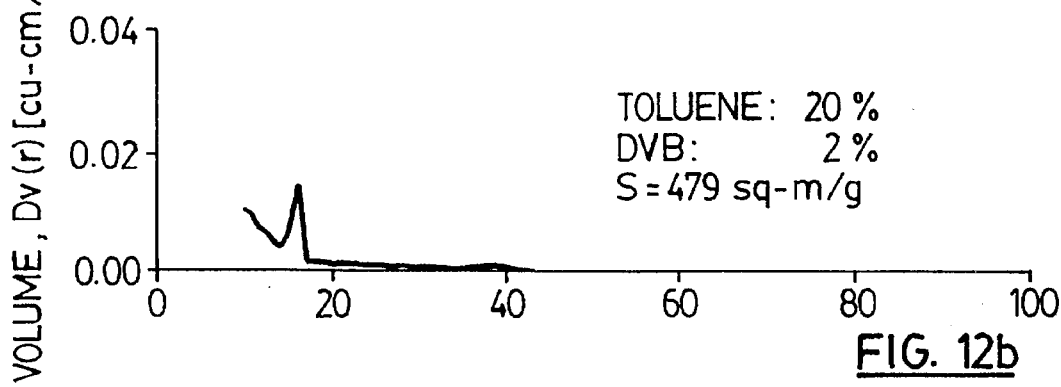
Figure 12C:
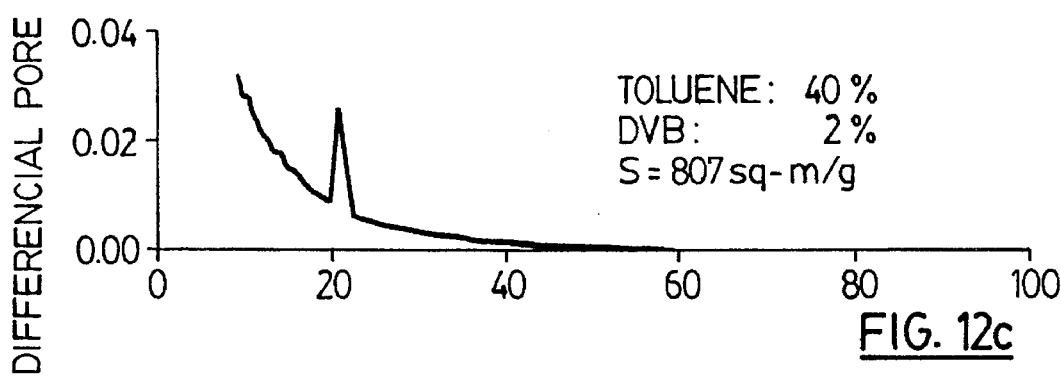
Figure 12D:
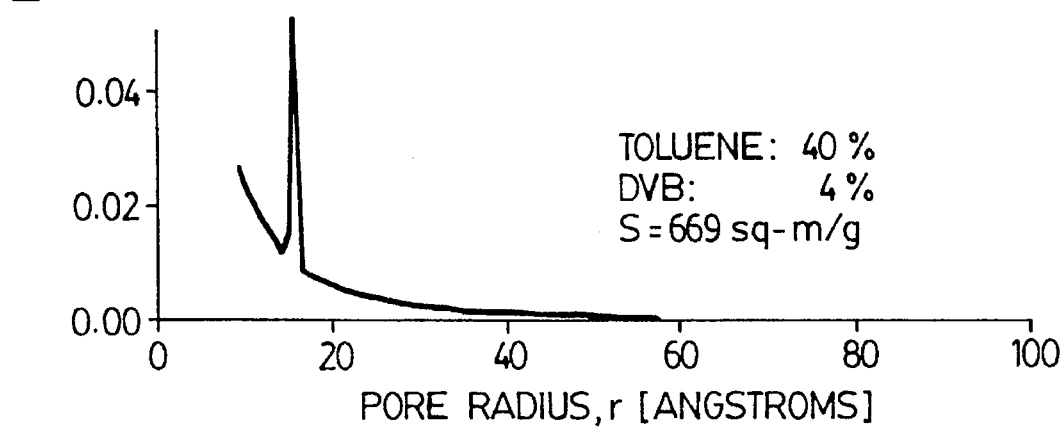

Referring to FIG. 9, the addition of 1 percent of propionitrile caused a decrease in particle diameter from 3.3 to 1.8 μm, accompanied by a severe broadening of particle size distribution. Further addition of propionitrile had little further effect until at sixty percent propionitrile a trimodal particle size distribution was observed indicating the sequential formation and stabilization of three generations of particles.

These results indicate that co-solvent composition may be used to control particle size as well as particle size distribution. This is further evidenced by FIG. 10 showing the mono-dispersed particles obtained in a reaction mixture comprising 2 volume percent DVB-55; 2 weight percent BPO initiator (relative to monomer) in a 7/3 (v/v) acetonitrile/n-butanol polymerization medium, at 70 degrees Celsius for 24 hours.

EXAMPLE 3

The following examples were carried out using toluene as a co-solvent in acetonitrile, with 2 to 5 volume percent of the reaction mixture being monomer, 2 weight percent being AIBN (relative to total monomer). The toluene volume fraction in the reaction mixture was varied from 0 to 40 percent. Table 3 illustrates the reaction conditions and results.

The materials were as follows:

i) DVB-55: (Technical grade, 55 percent divinylbenzene isomers, Aldrich Chemical Co.); Optionally, inhibitor was removed by a silica gel column shortly before the polymerizations;

ii) Acetonitrile (HPLC grade, Aldrich Chemical Co.);

iii) Toluene (Analytical Reagent grade, BDH Inc.);

iv) 2,2'-Azobis-(2-methylpropionitrile) (AIBN, Eastman Kodak Co.);

The apparatus involved a number of reactor vessels held in a grid-plate rotor and submerged in a water bath. The rotor plate was changeable in order to vary the size of the reactor vessels which can be changed from 30 mL up to 1000 mL. In most of the cases, HDPE or PP bottles were used as reactor vessels.

Typically, for 30 mL HDPE bottles, 0.6 mL commercial divinylbenzene, 0.011 g AIBN and a 30 mL mixture of the reaction mixture (acetonitrile and toluene in various proportions) were added to each bottle, with up to 12 reactor bottles horizontally attached to the grid-plate rotor for polymerization under common conditions. All the experiments were carried out with a grid plate rotating speed of about 30 rpm. The temperature of the water bath was raised from room temperature to 70° C. in about 2 hours, and then kept at 70° C. for 24 hours.

Another reactor involved a glass tube closed at one end and rotated at an angle of 15 degrees with the lower, closed end submerged in a thermostatic bath. The upper section of the glass tube was cooled to avoid loss of solvent, while the open end of the tube could be used for semi-batch addition of cross-linking agent and initiator, as well as removal of samples at different points during the reaction. The glass tube was rotated by means of a Büchi rotary evaporator assembly.

Still another reactor involved an apparatus having a set of parallel, internally heated steel rollers in an enclosed cabinet. In this case, the heating current to the rollers was controlled by a thermocouple and temperature controller.

Still another reactor involved a jacketed 1 liter glass reaction vessel fitted with an overhead paddle stirrer and having temperature controlled water circulating through the outer glass jacket.

For work-up, the microspheres were then separated from the reaction mixture, successively washed three times with tetrahydofuran, ethanol, acetone and then dried in a vacuum oven at 50° C. The reaction mixture and the tetrahydrofuran from the washing were collected and concentrated, the soluble polymers were then precipitated from the solution using an excess of methanol and dried in a vacuum oven at 50° C.

Conversion to soluble polymers and to particles was determined by gravimetry.

Particle size and particle size distributions were measured using a 256-channel COULTER MULTISIZER II with ISOTON II as electrolyte. An orifice tube with an aperture of 30 μm was used for all measurements. Surface morphology of the resins was studied by an ISI DC-130 Scanning Electron Microscope.

Pore volume, pore size distributions and specific surface areas of the microspheres were measured with a QUANTACHROME AUTOSORB-1 automated gas adsorption system using nitrogen at 77° K. as an adsorbate.

For the soluble polymer fraction, molecular weight averages and their distributions were analyzed using size exclusion chromatography. A WATERS Model 590 Programmable Solvent Delivery Module with a Model 410 Differential Refractometer Detector equipped with 3 POLYMER LABORATORIES ULTRASTYRA GEL columns were used with tetrahydrofuran as the mobile phase.

Referring to table 3, toluene volume percent was increased form 0 to 100 percent. DVB volume percent was held to 2 percent with the exception of the bottom three experiments where DVB-55 was increased to 3, 4 and 5 volume percent. In all cases, AIBN was 2 weight percent relative to DVB-55.

Between 0 and 25 percent toluene, the diameter increased from 4 to 6.58 μm, while from 25 to 40 percent toluene, the diameter decreased again to 4.62 μm at 40 percent toluene. However, the Coefficient of Variation had an opposite trend, decreasing from 3.67 percent in neat acetonitrile to 2.85 percent at 25 volume percent toluene and then increasing again to 6.43 percent at 40 percent toluene.

Toluene fractions of 45 and 50 volume percent resulted in gel formation while reactions in neat toluene only produced soluble polymers. In addition to the solid particles, the fraction of soluble polymers (that is highly branched poly-DVB55) was isolated and measured gravimetrically. From table 3, it can be seen that both the amount of soluble polymer as well as its molecular weight increased with volume percent toluene in solution. This may be explained by the fact that a higher toluene fraction increased the solvency of the reaction mixture for the DVB-55 oligomers, allowing higher molecular weight oligomers to remain dissolved in the reaction mixture.

It was also observed that the total conversion of DVB55 increased with increasing toluene volume percent. This may be due to the swelling and to the chain-transfer action of toluene. The three examples at the bottom of the table indicate that narrow disperse microspheres may be obtained at DVB55 loadings of up to 5 volume percent. These higher monomer loadings also increased the conversion to microspheres to above 80 percent.

Table 4 represents an analysis of the surface area, the total pore volume, and the major peak radius. As the toluene fraction increased from 0 to 40 percent the surface area increased from 9 square meters per gram up to 807 square meters per gram. At the same time, the total pore volume (for the pore range of less than 500–800 Ångstroms) increased from 0.013 to 0.5 cubic centimeters per gram.

The peak radius refers to the radius of the dominant pore size seen in FIG. 12. Especially at higher toluene fractions, a large fraction of the pores had a well defined pore radius falling between 15 and 20 angstroms, making these microspheres potentially useful as selective absorbants.

As evidenced in FIG. 12, the average interstitial pore radius increases from about 15 to about 21 Angstroms for the toluene volume fraction in the reaction mixture increasing from 20 percent to 40 percent. This increase in the interstitial pore radius is believed to derive a corresponding increase in the primary particle size. These results appear to indicate that porogen volume fraction (along with reaction temperature and effective cross-linking agent concentration) should influence the primary particle size and hence the average interstitial pore radius.

In summary, these results suggest that the microspheres were formed by a mechanism involving continuous precipitation of primary particles onto the surface of the growing microsphere structures. The resultant interstitial volume between those precipitated primary particles is believed to correspond to the dominant peaks in the pore size distribution. The smaller pores (is less than 15 angstrom pore radius) also seen in FIG. 11, are believed to be due to porosity within the aggregated primary particles, caused by continued cross-linking and phase separation during the particle growth phase.

We claim:

1. A method of forming cross-linked polymer microspheres, comprising the steps of:

forming a reaction mixture essentially free of stabilizer and comprising a polymerization medium, a styrene-type cross-linking agent, a radical initiator, and a porogen, with said cross-linking agent, said initiator and said porogen being soluble in said polymerization medium;

subjecting said reaction mixture to conditions selected to form porous monodisperse microspheres, wherein said porogen is toluene, wherein said toluene is provided to said medium at a level not exceeding 40 percent by volume of said reaction mixture.

2. A method as defined in claim 1 wherein said polymerization medium is acetonitrile.

3. A method as defined in claim 2 wherein said radical initiator is an azo-type initiator.

4. A method as defined in claim 1 wherein said polymerization medium is acetonitrile, said radical initiator is an azo-type initiator and said porogen is toluene, said toluene ranging from about 5 to about 40 percent by volume of said reaction mixture.

5. A method as defined in claim 4 wherein said di-vinyl cross-linking agent is a styrene-type cross-linking agent, said cross-linking agent ranging from about 2 to about 5 volume percent of said reaction mixture.

6. A method as defined in claim 5 wherein said initiator is AIBN, said initiator being about 2 weight percent relative to said styrene-type cross-linking agent.

* * * * *